(12) United States Patent
Li

(10) Patent No.: US 12,096,398 B2
(45) Date of Patent: Sep. 17, 2024

(54) METHOD FOR NOTIFICATION MESSAGE CONTROL AND RELATED DEVICES

(71) Applicant: GUANGDONG OPPO MOBILE TELECOMMUNICATIONS CORP., LTD., Guangdong (CN)

(72) Inventor: Xiong Li, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 303 days.

(21) Appl. No.: 17/685,071

(22) Filed: Mar. 2, 2022

(65) Prior Publication Data
US 2022/0191826 A1 Jun. 16, 2022

Related U.S. Application Data

(63) Continuation of application No. PCT/CN2020/111422, filed on Aug. 26, 2020.

(30) Foreign Application Priority Data

Sep. 17, 2019 (CN) .......................... 201910876633.1

(51) Int. Cl.
*H04W 68/02* (2009.01)
*H04W 12/06* (2021.01)
(Continued)

(52) U.S. Cl.
CPC ........... *H04W 68/02* (2013.01); *H04W 12/06* (2013.01); *H04W 12/08* (2013.01); *H04W 60/04* (2013.01); *H04W 68/005* (2013.01); *H04W 84/12* (2013.01)

(58) Field of Classification Search
CPC .... H04L 51/224; H04W 12/06; H04W 12/08; H04W 4/12; H04W 48/12; H04W 48/16;
(Continued)

(56) References Cited

U.S. PATENT DOCUMENTS

| 8,351,898 B2 | 1/2013 | Raleigh |
| 2012/0258691 A1 | 10/2012 | Baer et al. |

FOREIGN PATENT DOCUMENTS

| CN | 102255916 | 11/2011 |
| CN | 202524563 | 11/2012 |

(Continued)

OTHER PUBLICATIONS

English translation of WO 2021.036558 A1, Date Published Mar. 4, 2021 (Year: 2021).*

(Continued)

*Primary Examiner* — Nader Bolourchi
(74) *Attorney, Agent, or Firm* — Hodgson Russ LLP

(57) ABSTRACT

A method for notification message control and related devices are provided. The method is performed by an electronic device accessing a first Wi-Fi network through a first Wi-Fi network interface of the electronic device. The method includes the following. Upon detecting a pop-up request for an authentication notification message of a second Wi-Fi network, a network identifier of the second Wi-Fi network is obtained, where the second Wi-Fi network has not been successfully accessed through a second Wi-Fi network interface of the electronic device. Upon detecting that the second Wi-Fi network is contained in a historical connection record of requesting connection through the second Wi-Fi network interface according to the network identifier, a response strategy for the pop-up request is determined according to the historical connection record. Respond to the pop-up request according to the response strategy.

20 Claims, 6 Drawing Sheets

(51) Int. Cl.
*H04W 12/08* (2021.01)
*H04W 60/04* (2009.01)
*H04W 68/00* (2009.01)
*H04W 84/12* (2009.01)

(58) Field of Classification Search
CPC ... H04W 48/18; H04W 60/04; H04W 68/005; H04W 68/02; H04W 84/12; H04W 88/06
See application file for complete search history.

(56) References Cited

FOREIGN PATENT DOCUMENTS

| | | |
|---|---|---|
| CN | 105656500 | 6/2016 |
| CN | 105657746 | 6/2016 |
| CN | 105744646 | 7/2016 |
| CN | 106376054 | 2/2017 |
| CN | 106658672 | 5/2017 |
| CN | 106688284 | 5/2017 |
| CN | 106888454 | 6/2017 |
| CN | 109189528 | 1/2019 |
| CN | 109743712 | 5/2019 |
| CN | 109803325 | 5/2019 |
| EP | 3920583 A1 | 12/2021 |
| KR | 20120126860 | 11/2012 |
| WO | WO-2021036558 A1 * | 3/2021 ............ H04W 12/06 |

OTHER PUBLICATIONS

CNIPA, First Office Action for CN Application No. 201910876633. 1, Feb. 18, 2021.
CNIPA, Notification to Grant Patent Right for Invention for CN Application No. 201910876633.1, Jun. 16, 2021.
WIPO, International Search Report for PCT/CN2020/111422, Dec. 1, 2020.
EPO, Extended European Search Report for EP Application No. 20864490.6, Sep. 28, 2022.
Naoki Imai et al., A Consolidated Power Saving Architecture Accommodating Push-type Applications for Dual-mode Devices, Computers and Communication (ISCC), 2010 IEEE Symposium on IEEE, Piscataway, New Jersey, Jun. 22, 2010.

* cited by examiner

| Obtain, by an electronic device, a network identifier of a second Wi-Fi network upon detecting a pop-up request for a first authentication notification message of the second Wi-Fi network, where the second Wi-Fi network is a Wi-Fi network that has not been successfully accessed through a second Wi-Fi network interface | ╱ S201 |

↓

| Detect, by the electronic device, according to the network identifier, whether the second Wi-Fi network is contained in a historical connection record of requesting connection through the second Wi-Fi network interface | ╱ S202 |

↓

| Determine, by the electronic device, a response strategy for the pop-up request according to the historical connection record on condition that the second Wi-Fi network is contained in the historical connection record | ╱ S203 |

↓

| Respond to, by the electronic device, the pop-up request according to the response strategy | ╱ S204 |

FIG. 2A

| Obtain, by an electronic device, a network identifier of a second Wi-Fi network upon detecting a pop-up request for a first authentication notification message of the second Wi-Fi network, where the second Wi-Fi network is a Wi-Fi network that has not been successfully accessed through a second Wi-Fi network interface | S301 |

↓

| Detect, by the electronic device, according to the network identifier, whether the second Wi-Fi network is contained in a historical connection record of requesting connection through the second Wi-Fi network interface, where the historical connection record is a network accessed by the electronic device in a previous network connection of a present network connection | S302 |

↓

| On condition that the second Wi-Fi network is contained in the historical connection record, upon detecting that a historical authentication notification message of the second Wi-Fi network is not selected, determine, by the electronic device, that a response strategy for the pop-up request is to refuse to respond to the pop-up request for a first time period | S303 |

↓

| Respond to, by the electronic device, the pop-up request according to the response strategy | S304 |

FIG. 3

```
┌─────────────────────────────────────────────────┐
│ Obtain, by an electronic device, a network identifier of a second │
│   Wi-Fi network upon detecting a pop-up request for a first       │
│   authentication notification message of the second Wi-Fi          ──── S401
│ network, where the second Wi-Fi network is a Wi-Fi network        │
│ that has not been successfully accessed through a second Wi-Fi    │
│                    network interface                              │
└─────────────────────────────────────────────────┘
                           ▼
┌─────────────────────────────────────────────────┐
│  Detect, by the electronic device, according to the network       │
│  identifier, whether the second Wi-Fi network is contained in a   │
│  historical connection record of requesting connection through    ──── S402
│    the second Wi-Fi network interface, where the historical       │
│    connection record is a network accessed by the electronic      │
│  device in a previous network connection of a present network     │
│                          connection                               │
└─────────────────────────────────────────────────┘
                           ▼
┌─────────────────────────────────────────────────┐
│  On condition that the second Wi-Fi network is contained in the   │
│     historical connection record, upon detecting that a historical│
│      authentication notification message of the second Wi-Fi      ──── S403
│  network is not selected, determine, by the electronic device, that│
│    a response strategy for the pop-up request is to respond to the│
│    pop-up request and pop up the first authentication notification│
│                  message after a first time period                │
└─────────────────────────────────────────────────┘
                           ▼
┌─────────────────────────────────────────────────┐
│     Respond to, by the electronic device, the pop-up request      ──── S404
│              according to the response strategy                   │
└─────────────────────────────────────────────────┘
```

FIG. 4

METHOD FOR NOTIFICATION MESSAGE CONTROL AND RELATED DEVICES

CROSS-REFERENCE TO RELATED APPLICATION(S)

This application is a continuation of International Application No. PCT/CN2020/111422, filed on Aug. 26, 2020, which claims priority to Chinese Patent Application No. 201910876633.1, filed on Sep. 17, 2019, the entire disclosures of which are incorporated herein by reference.

TECHNICAL FIELD

This disclosure relates to the technical field of electronic devices, and particularly to a method for notification message control and related devices.

BACKGROUND

With the popularization of electronic devices such as smart phones, the smart phone can support more and more applications and its functions are becoming more and more powerful. Smart phones are developing in a diversified and personalized direction and have become an indispensable electronic product in people's daily life. In order to ensure normal operation of an application of a smart phone, the smart phone generally requires a stable and efficient network connection, and a relatively fast network speed and relatively low network delay. Accordingly, a smart phone with a dual wireless fidelity (Wi-Fi) function has emerged. The smart phone with a dual Wi-Fi function can access two different Wi-Fi networks at the same time to improve efficiency of network data transmission, because the smart phone can support Wi-Fi in 2.4 GHz and 5 GHz frequency bands, where one Wi-Fi is primary Wi-Fi, and the other Wi-Fi is secondary Wi-Fi. Generally, a usage priority of the primary Wi-Fi is higher than that of the secondary Wi-Fi.

SUMMARY

In a first aspect, implementations of the disclosure provide a method for notification message control. The method is performed by an electronic device. The electronic device includes a first wireless fidelity (Wi-Fi) network interface and a second Wi-Fi network interface. The electronic device accesses a first Wi-Fi network through the first Wi-Fi network interface. The method includes the following. Upon detecting a pop-up request for an authentication notification message of a second Wi-Fi network, a network identifier of the second Wi-Fi network is obtained, where the second Wi-Fi network is a Wi-Fi network that has not been successfully accessed through the second Wi-Fi network interface. A response strategy for the pop-up request is determined according to a historical connection record of requesting connection through the second Wi-Fi network interface, upon detecting that the second Wi-Fi network is contained in the historical connection record according to the network identifier. Respond to the pop-up request according to the response strategy.

In a second aspect, implementations of the disclosure provide an electronic device. The electronic device includes a first Wi-Fi network interface, a second Wi-Fi network interface, a processor, and a memory. The memory is coupled to the processor and stores one or more programs. The programs include instructions which are operable with the processor to: obtain a network identifier of a second Wi-Fi network upon detecting a pop-up request for an authentication notification message of the second Wi-Fi network, the second Wi-Fi network being a Wi-Fi network that has not been successfully accessed through the second Wi-Fi network interface, the electronic device accessing a first Wi-Fi network through the first Wi-Fi network interface; detect that the second Wi-Fi network is contained in a historical connection record of requesting connection through the second Wi-Fi network interface according to the network identifier; determine a response strategy for the pop-up request according to the historical connection record; and respond to the pop-up request according to the response strategy.

In a third aspect, implementations of the disclosure provide a non-transitory computer-readable storage medium. The non-transitory computer-readable storage medium stores computer programs which, when executed by a processor, cause the processor to execute all or part of the operations of the method described in the first aspect of the implementations of the disclosure.

BRIEF DESCRIPTION OF THE DRAWINGS

In order to describe technical solutions of implementations of the disclosure or the related art more clearly, the following will give a brief description of accompanying drawings used for describing the implementations or the related art. Apparently, accompanying drawings described below are merely some implementations. Those of ordinary skill in the art can also obtain other accompanying drawings based on the accompanying drawings described below without creative efforts.

FIG. 2A is a schematic flowchart illustrating a method for notification message control provided in implementations of the disclosure.

FIG. 3 is a schematic flowchart illustrating a method for notification message control provided in other implementations of the disclosure.

FIG. 4 is a schematic flowchart illustrating a method for notification message control provided in other implementations of the disclosure.

DETAILED DESCRIPTION

Figure 1:
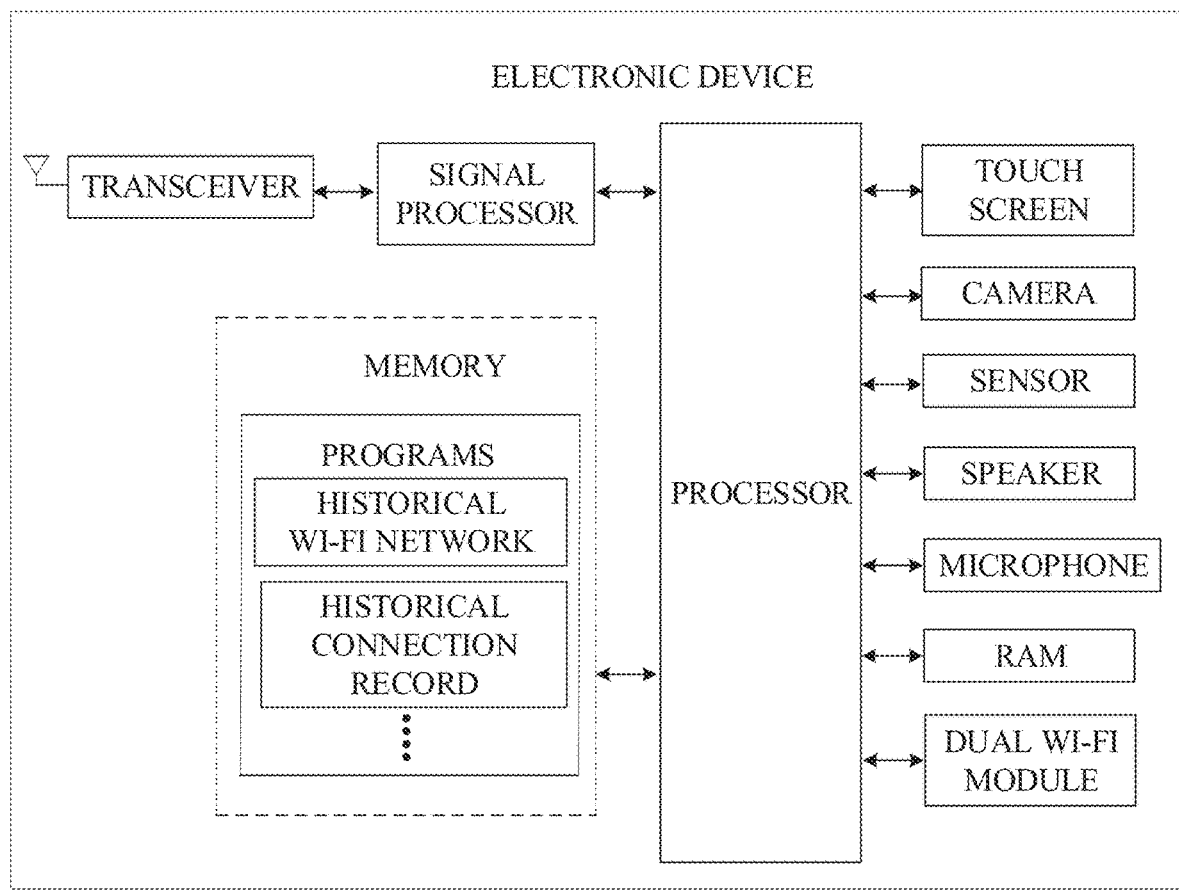
FIG. 1 is a schematic structural diagram illustrating an electronic device provided in implementations of the disclosure.

In order for those skilled in the art to better understand technical solutions of the disclosure, the technical solutions of the implementations of the disclosure will be described clearly and completely with reference to accompanying drawings in the implementations. Apparently, implementations described below are merely some implementations, rather than all implementations of the disclosure. All other implementations obtained by those of ordinary skill in the art based on the implementations without creative efforts shall fall within the protection scope of the disclosure.

The terms "first", "second", and the like used in the specification, the claims, and the accompany drawings of the disclosure are used to distinguish different objects rather than describe a particular order. The terms "include", "comprise", and "have" as well as variations thereof are intended to cover non-exclusive inclusion. For example, a process, method, system, product, or device including a series of steps or units is not limited to the listed steps or units, on the contrary, it can optionally include other steps or units that are not listed; alternatively, other steps or units inherent to the process, method, product, or device can be included either.

The term "implementation" referred to herein means that particular features, structures, or properties described in conjunction with the implementations may be defined in at least one implementation of the disclosure. The phrase "implementation" appearing in various places of the specification does not necessarily refer to the same implementation or an independent/alternative implementation that is mutually exclusive with other implementations. Those skilled in the art will understand expressly and implicitly that an implementation described herein may be combined with other implementations.

"Electronic device" in implementations of the disclosure may include various handheld devices with wireless communication functions, on-board devices, wearable devices (e.g., smart watches, smart bracelets, pedometers, etc.), computing devices, or other processing devices connected to a wireless modem, as well as various forms of user equipment (UE), mobile stations (MS), terminal device, etc. For convenience of description, the above-mentioned devices are collectively referred to as electronic devices.

Hereinafter, implementations of the disclosure will be described in detail.

According to implementations of the disclosure, a method for notification message control is provided. The method is performed by an electronic device. The electronic device includes a first wireless fidelity (Wi-Fi) network interface and a second Wi-Fi network interface. The electronic device accesses a first Wi-Fi network through the first Wi-Fi network interface. The method includes the following. Upon detecting a pop-up request for an authentication notification message of a second Wi-Fi network, a network identifier of the second Wi-Fi network is obtained, where the second Wi-Fi network is a Wi-Fi network that has not been successfully accessed through the second Wi-Fi network interface. A response strategy for the pop-up request is determined according to a historical connection record of requesting connection through the second Wi-Fi network interface, upon detecting that the second Wi-Fi network is contained in the historical connection record according to the network identifier. Respond to the pop-up request according to the response strategy.

In some implementations, the historical connection record contains a network accessed by the electronic device in a previous network connection of a present network connection, and the historical connection record records that a quality score of a historical network speed of the second Wi-Fi network is lower than a preset score, determining the response strategy for the pop-up request according to the historical connection record includes: determining that the response strategy for the pop-up request is to refuse to respond to the pop-up request for a first time period, upon detecting that the quality score of the historical network speed of the second Wi-Fi network is lower than the preset score.

In some implementations, the historical connection record contains a network accessed by the electronic device in a previous network connection of a present network connection, and the historical connection record records that a historical authentication notification message of the second Wi-Fi network is not selected, determining the response strategy for the pop-up request according to the historical connection record includes: determining that the response strategy for the pop-up request is to refuse to respond to the pop-up request for a first time period, upon detecting that the historical authentication notification message of the second Wi-Fi network is not selected.

In some implementations, the historical connection record contains a network accessed by the electronic device in a previous network connection of a present network connection, and the historical connection record records that a historical authentication notification message of the second Wi-Fi network is not selected, determining the response strategy for the pop-up request according to the historical connection record includes: determining that the response strategy for the pop-up request is to respond to the pop-up request and pop up the authentication notification message after a first time period, upon detecting that the historical authentication notification message of the second Wi-Fi network is not selected.

In some implementations, responding to the pop-up request and popping up the authentication notification message include: popping up and displaying the authentication notification message on a present interface, or popping up and displaying the authentication notification message on the present interface and then hiding the authentication notification message in a message notification column.

In some implementations, the method further includes: after responding to the pop-up request and popping up the authentication notification message, detecting that the authentication notification message is selected within a second time period; and jumping to an authentication interface of the second Wi-Fi network, where the authentication interface is used to prompt a user to enter authentication information of successfully accessing the second Wi-Fi network, and the authentication information includes account information and password information.

In some implementations, the method further includes: after responding to the pop-up request and popping up the authentication notification message, detecting that the authentication notification message is not selected within a second time period; and accessing a third Wi-Fi network through the second Wi-Fi network interface, where the third Wi-Fi network is a Wi-Fi network successfully accessed through the second Wi-Fi network interface previously.

In some implementations, the method further includes: determining a quality score of the first Wi-Fi network; searching for the second Wi-Fi network having a quality score higher than a preset score upon detecting that the quality score of the first Wi-Fi network is lower than the preset score; and sending a connection request to the second Wi-Fi network, and generating the pop-up request for the authentication notification message of the second Wi-Fi network.

In some implementations, a quality score of the first Wi-Fi network is generated according to a network quality parameter of the first Wi-Fi network, and the quality score of the second Wi-Fi network is generated according to the network quality parameter of the second Wi-Fi network, where the network quality parameter includes at least one of network signal strength, a network data transmission speed, network delay, or network throughput.

According to implementations of the disclosure, an electronic device is provided. The electronic device includes a first Wi-Fi network interface, a second Wi-Fi network interface, a processor, and a memory. The memory is coupled to the processor and stores one or more programs. The programs include instructions which are operable with the processor to: obtain a network identifier of a second Wi-Fi network upon detecting a pop-up request for an authentication notification message of the second Wi-Fi network, the second Wi-Fi network being a Wi-Fi network that has not been successfully accessed through the second Wi-Fi network interface, the electronic device accessing a first Wi-Fi network through the first Wi-Fi network interface; detect that the second Wi-Fi network is contained in a historical connection record of requesting connection through the second Wi-Fi network interface according to the network identifier; determine a response strategy for the pop-up request according to the historical connection record; and respond to the pop-up request according to the response strategy.

According to implementations of the disclosure, a non-transitory computer-readable storage medium is provided. The non-transitory computer-readable storage medium stores computer programs which, when executed by a processor, cause the processor to execute all or part of the operations of the above method of the implementations of the disclosure.

Please refer to FIG. 1, FIG. 1 is a schematic structural diagram illustrating an electronic device provided in implementations of the disclosure. The electronic device includes a processor, a memory, a signal processor, a transceiver, a touch screen, a dual Wi-Fi module, a speaker, a microphone, a random access memory (RAM), a camera, a sensor, and the like. The memory, the signal processor, the dual Wi-Fi module, the touch screen, the speaker, the microphone, the RAM, the sensor, and the camera are connected with the processor. The transceiver is connected with the signal processor.

The touch screen may be a liquid crystal display (LCD), an organic light-emitting diode (OLED) or inorganic light-emitting diode, an active matrix organic light-emitting diode (AMOLED), and the like.

The camera may be an ordinary camera or an infrared camera, or may also be a front camera or a rear camera, which is not limited herein.

The sensor includes at least one of a light sensor, a gyroscope, an infrared proximity sensor, a fingerprint sensor, or a pressure sensor, or the like. The light sensor, also known as an ambient light sensor, is configured to detect brightness of ambient light. The light sensor may include a photosensitive element and an analog-to-digital converter. The photosensitive element is configured to convert an optical signal collected into an electrical signal. The analog-to-digital converter is configured to convert the electrical signal into a digital signal. Optionally, the light sensor may also include a signal amplifier. The signal amplifier can amplify the electrical signal converted by the photosensitive element and then output it to the analog-to-digital converter. The photosensitive element may include at least one of a photodiode, a phototransistor, a photoresistor, or a silicon photocell.

The processor is a control center of the electronic device. The processor uses various interfaces and lines to connect various parts of the whole electronic device. By running or executing software programs and/or modules stored in the memory and calling data stored in the memory, the processor can perform various functions of the electronic device and process data, so as to monitor the electronic device as a whole.

The processor may be integrated with an application processor and a modem processor. The application processor mainly handles with an operating system, a user interface, and an application. The modem processor mainly handles with wireless communications. It can be understood that the above modem processor may not be integrated into the processor.

The memory is configured to store software programs and/or modules. The processor executes various functional applications of the electronic device and processes data by running the software programs and/or modules stored in the memory. The memory can mainly include a program storage area and a data storage area. The operating system, software programs required by at least one function, and the like can be stored in the program storage area. Data created according to use of the electronic device and the like can be stored in the data storage area. In addition, the memory may include a high-speed RAM, and may also include a non-transitory memory, such as at least one of a magnetic disk memory device, a flash memory device, or other transitory solid-state memory devices.

The memory may store wireless network information such as information about historical Wi-Fi networks and historical connection records through a second Wi-Fi network interface.

The dual Wi-Fi module can create two Wi-Fi network interfaces at the same time. The two Wi-Fi network interfaces can be connected to two different wireless networks respectively, so that an electronic device can support concurrent work in 2.4 GHz and 5 GHz frequency bands and upload or download data through the two Wi-Fi network interfaces, thereby achieving an effect of network acceleration.

Please refer to FIG. 2A, FIG. 2A is a schematic flowchart illustrating a method for notification message control provided in implementations of the disclosure. The method is performed by an electronic device. The electronic device includes a first Wi-Fi network interface and a second Wi-Fi network interface. The electronic device accesses a first Wi-Fi network through the first Wi-Fi network interface. As illustrated in FIG. 2A, the method for notification message control includes the following.

At S201, upon detecting a pop-up request for an authentication notification message of a second Wi-Fi network, the electronic device obtains a network identifier of the second Wi-Fi network, where the second Wi-Fi network is a Wi-Fi network that has not been successfully accessed through the second Wi-Fi network interface.

The electronic device of implementations of the disclosure has a dual Wi-Fi function, and supports primary Wi-Fi and secondary Wi-Fi. That is, the electronic device can access two Wi-Fi networks at the same time. The primary Wi-Fi corresponds to the first Wi-Fi network interface, and the secondary Wi-Fi corresponds to the second Wi-Fi network interface, and so, the electronic device can access the first Wi-Fi network through the first Wi-Fi network interface and access the second Wi-Fi network through the second Wi-Fi network interface. A usage priority of the primary Wi-Fi is higher than that of the secondary Wi-Fi. The electronic device can use two Wi-Fi networks for network data transmission at the same time, which can achieve a faster network speed and lower network delay than using only one Wi-Fi network for network data transmission. Generally, the secondary Wi-Fi is used only when a network performance of the primary Wi-Fi is poor. When the network performance of the primary Wi-Fi becomes good, the secondary Wi-Fi will be released again. Therefore, under extreme network conditions, switching between the use and release of the secondary Wi-Fi may occur frequently.

When the electronic device accesses a Wi-Fi network that requires login authentication, the electronic device pops up an authentication notification message. Once the authentication notification message is selected by a user, the electronic device jumps to an authentication interface where relevant authentication information needs to be entered. The electronic device can access the Wi-Fi network for normal use after the authentication passes. Although authentication of a Wi-Fi network has been passed by the primary Wi-Fi, since a media access control (MAC) addresses of the primary Wi-Fi is different from that of the secondary Wi-Fi, for the secondary Wi-Fi, authentication still needs to be performed again when using the secondary Wi-Fi to access the Wi-Fi network. When using the secondary Wi-Fi, on condition that authentication information needs to be entered each time the secondary Wi-Fi is used to access a Wi-Fi network, if the user does not want to perform an authentication operation currently or does not want to use a Wi-Fi network currently being accessed by means of the secondary Wi-Fi, but an authentication notification message is still popped up, the user may suffer interferences. As a result, user experience is reduced. Therefore, in the disclosure, upon detecting the pop-up request for the authentication notification message of the second Wi-Fi network, instead of responding to the pop-up request immediately and displaying the authentication notification message on a screen, the electronic device obtains the network identifier of the second Wi-Fi network, such as a service set identifier (SSID). Then, whether the second Wi-Fi network currently accessed through the second Wi-Fi interface is the same as a Wi-Fi network previously accessed can be detected according to the SSID.

The second Wi-Fi network herein is a Wi-Fi network not yet successfully accessed through the second Wi-Fi network interface. Although the second Wi-Fi network may have been successfully accessed through the first Wi-Fi network interface and authentication information of the second Wi-Fi network may have been saved, authentication is still required when accessing the second Wi-Fi network through the second Wi-Fi network interface. After the authentication passes, the second Wi-Fi network can be accessed successfully. Therefore, when trying to access the second Wi-Fi network through the second Wi-Fi network interface, the pop-up request for the authentication notification message is generated, to pop up the authentication notification message.

At S202, the electronic device detects, according to the network identifier, whether the second Wi-Fi network is contained in a historical connection record of requesting connection through the second Wi-Fi network interface.

The electronic device stores an identifier of a Wi-Fi network accessed through the second Wi-Fi network interface, such as an SSID. According to the network identifier of the second Wi-Fi network, whether the second Wi-Fi network is contained in the historical connection record of requesting connection through the second Wi-Fi network interface can be determined.

At S203, the electronic device determines a response strategy for the pop-up request according to the historical connection record on condition that the second Wi-Fi network is contained in the historical connection record.

If it is detected that the electronic device has requested to access the second Wi-Fi network through the second Wi-Fi network interface, it can be seen that, in a previous requesting connection to the second Wi-Fi network, a historical authentication notification message may be popped up, but the historical authentication notification message is not selected by the user or user authentication fails; or, in a previous requesting connection to the second Wi-Fi network, the historical authentication notification message is not popped up, so that the user cannot perform an authentication operation. Therefore, for a present pop-up request against the authentication notification message of the second Wi-Fi network, the response strategy for the pop-up request can be determined according to the historical connection record of the second Wi-Fi network.

At S204, the electronic device responds to the pop-up request according to the response strategy.

As can be seen, in the implementations of the disclosure, the electronic device obtains the network identifier of the second Wi-Fi network upon detecting the pop-up request for the authentication notification message of the second Wi-Fi network, where the second Wi-Fi network is a Wi-Fi network that has not been successfully accessed through the second Wi-Fi network interface. The electronic device detects, according to the network identifier, whether the second Wi-Fi network is contained in the historical connection record of requesting connection through the second Wi-Fi network interface. The electronic device determines the response strategy for the pop-up request according to the historical connection record on condition that the second Wi-Fi network is contained in the historical connection record. The electronic device responds to the pop-up request according to the response strategy. Upon detecting the pop-up request for the authentication notification message of the second Wi-Fi network, instead of popping up the authentication notification message immediately, the electronic device obtains the network identifier of the second Wi-Fi network and determines, according to the network identifier, whether the second Wi-Fi network is contained in the historical connection record of requesting connection through the second Wi-Fi network interface, so that the response strategy for the pop-up request is determined according to the historical connection record of the second Wi-Fi network, to determine whether to pop up the authentication notification message this time, which can avoid interferences to a user caused by frequent pop-up of an authentication notification message.

In one possible example, the historical connection record is a network accessed by the electronic device in a previous network connection of a present network connection, and the historical connection record is that a quality score of a historical network speed of the second Wi-Fi network is lower than a preset score. The response strategy for the pop-up request is determined according to the historical connection record as follows. Upon detecting that the quality score of the historical network speed of the second Wi-Fi network is lower than the preset score, the electronic device determines that the response strategy for the pop-up request is to refuse to respond to the pop-up request for a first time period.

If the historical connection record of requesting connection through the second Wi-Fi network interface is a network accessed in a previous network connection of a present network connection, and the historical connection record of the second Wi-Fi network records that a quality score of the second Wi-Fi network is lower than the preset score in a previous connection to the second Wi-Fi network, it is indicated that a network quality of the second Wi-Fi network is poor in the previous connection to the second Wi-Fi network. The quality score may be calculated according to a network quality parameter of the second Wi-Fi network. The network quality parameter may be, for example, network signal strength, a network transmission speed, or the like. Based on determination that the network quality of the second Wi-Fi network is poor in the previous connection to the second Wi-Fi network and an interval between the time of a present connection to the second Wi-Fi network and the time of the previous connection to the second Wi-Fi network is shorter than the first time period (e.g., ten minutes), forbid popping up the authentication notification message of the second Wi-Fi network for ten minutes.

As can be seen, in this example, on condition that the interval between the time of the present connection to the second Wi-Fi network through the second Wi-Fi network interface and the time of the previous connection to the second Wi-Fi network through the second Wi-Fi network interface is shorter than the first time period, if it is detected that the quality score of the second Wi-Fi network is lower than the preset score in the previous connection to the second Wi-Fi network, it is determined that the user does not want to access the second Wi-Fi network through the second Wi-Fi network interface this time. Therefore, the electronic device refuses to respond to the pop-up request and does not pop up the authentication notification message. In this situation, the electronic device can access another Wi-Fi network having a better network quality through the second Wi-Fi network interface, which is beneficial to promoting improvement of a network usage status of the electronic device.

In one possible example, the historical connection record is a network accessed by the electronic device in a previous network connection of a present network connection, and the historical connection record is that a historical authentication notification message of the second Wi-Fi network is not selected. The response strategy for the pop-up request is determined according to the historical connection record as follows. Upon detecting that the historical authentication notification message of the second Wi-Fi network is not selected, the electronic device determines that the response strategy for the pop-up request is to refuse to respond to the pop-up request for a first time period.

If the historical connection record of requesting connection through the second Wi-Fi network interface is a network accessed in a previous network connection of a present network connection, and the historical connection record of the second Wi-Fi network records that in a previous requesting connection to the second Wi-Fi network, a historical authentication notification message of the second Wi-Fi network is not selected by the user after popping up the historical authentication notification message, it is indicated that the user does not want to use the second Wi-Fi network or the user does not know authentication information of the second Wi-Fi network. Therefore, based on determination that the authentication notification message popped up in the previous requesting connection to the second Wi-Fi network through the second Wi-Fi network interface is not selected and an interval between the time of a present connection to the second Wi-Fi network and the time of the previous connection to the second Wi-Fi network is shorter than the first time period (e.g., ten minutes), forbid popping up the authentication notification message of the second Wi-Fi network for ten minutes.

As can be seen, in this example, on condition that the interval between the time of the present connection to the second Wi-Fi network through the second Wi-Fi network interface and the time of the previous connection to the second Wi-Fi network through the second Wi-Fi network interface is shorter than the first time period, if it is detected that the historical authentication notification message popped up in the previous requesting connection to the second Wi-Fi network is not selected by the user, it is determined that the user has no tendency to use the second Wi-Fi network this time. Therefore, the electronic device refuses to respond to the pop-up request and does not pop up the authentication notification message. In this situation, the electronic device can access another Wi-Fi network having a better network quality through the second Wi-Fi network interface, which can avoid information interferences to a user caused by frequent pop-up of an authentication notification message.

In one possible example, upon detecting that the historical authentication notification message of the second Wi-Fi network is not selected, the electronic device determines that the response strategy for the pop-up request is to respond to the pop-up request and pop up the authentication notification message after the first time period.

On condition that the historical authentication notification message of the second Wi-Fi network is not selected by the user after popping up the historical authentication notification message previously, if an interval between the time of a present requesting connection to the second Wi-Fi network and the time of a previous requesting connection to the second Wi-Fi network is longer than the first time period (e.g., ten minutes), since a relatively long time period has elapsed, the user may be willing to use the second Wi-Fi network this time because of knowing authentication information of the second Wi-Fi network, or because only the second Wi-Fi network is available for use of the electronic device this time, or the like. In this situation, the authentication notification message of the second Wi-Fi network can be popped up.

As can be seen, in this example, although the historical authentication notification message of the second Wi-Fi network popped up previously is not selected by the user, if the interval between the time of the present requesting connection to the second Wi-Fi network and the time of the previous requesting connection to the second Wi-Fi network is longer than the first time period, the authentication notification message of the second Wi-Fi network is still popped up this time, so that the user can determine whether to access the second Wi-Fi network through the second Wi-Fi network interface, which can avoid frequent pop-up of an authentication notification message of a Wi-Fi network in a short time period.

In one possible example, the method further includes the following. After responding to the pop-up request and popping up the authentication notification message, whether the authentication notification message is selected within a second time period is detected. On condition that the authentication notification message is selected within the second time period, jump to an authentication interface of the second Wi-Fi network. The authentication interface is used to prompt a user to enter authentication information of successfully accessing the second Wi-Fi network. The authentication information includes account information and password information.

Figure 2B:
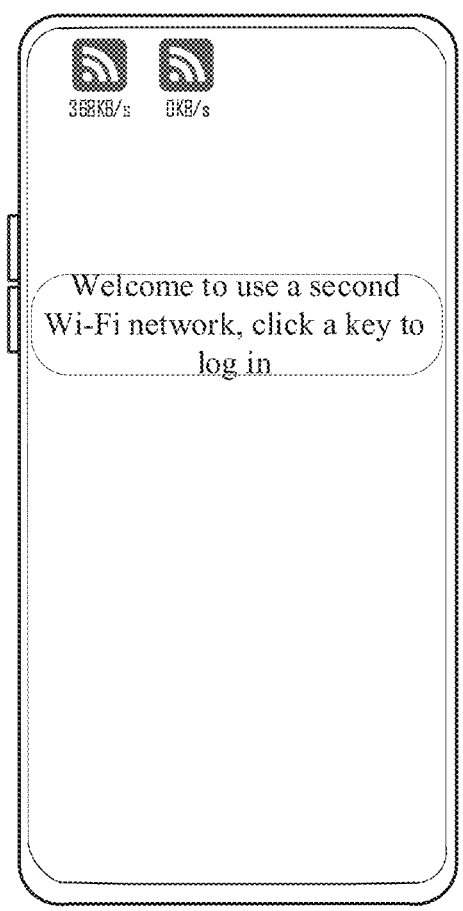
FIG. 2B is a reference exemplary diagram illustrating an authentication notification message popped up on an interface provided in implementations of the disclosure.

The authentication notification message is used to prompt the user that the second Wi-Fi network can be accessed through the second Wi-Fi network interface currently. The authentication notification message may be displayed in a message notification column. If the authentication notification message is clicked by the user, the electronic device jumps to an authentication interface of the second Wi-Fi network from an interface displayed, so that authentication information of the second Wi-Fi network is entered by the user on the authentication interface, to successfully access the second Wi-Fi network through the second Wi-Fi network interface. FIG. 2B is a reference exemplary diagram illustrating an authentication notification message popped up on an interface provided in implementations of the disclosure. The authentication notification message may be displayed in other display modes, which is not limited herein. It can be seen from FIG. 2B that if a signal of the first Wi-Fi network is poor (for example, when a data transmission speed is less than a preset data transmission speed of 500 KB/s, a signal of a present network is considered to be poor), a secondary Wi-Fi function needs to be enabled this time. Therefore, the authentication notification message is popped up. When popping up the authentication notification message, the authentication notification message is displayed on an interface displayed, and then the authentication notification message is hidden in a message notification column after the display is maintained for more than two or three seconds. A drag down operation may be performed by the user to view the message notification column, so that the authentication notification message can be viewed. If the authentication notification message is not selected by the user, the electronic device records the time when the authentication notification message is popped up and recording information that the authentication notification message is not selected by the user, and the authentication notification message not selected may be saved in the message notification column or automatically cleaned up upon detecting that the electronic device deactivates the second Wi-Fi network interface.

As can be seen, in this example, the authentication notification message is used to prompt the user that the second Wi-Fi network can be accessed through the second Wi-Fi network interface currently. If the authentication notification message is selected by the user, an authentication interface of the second Wi-Fi network is further entered. If the authentication notification message is not selected by the user, a terminal records the time when the authentication notification message is popped up and information such as not being selected, so that in a next requesting connection to the second Wi-Fi network through the second Wi-Fi network interface, whether to pop up the authentication notification message of the second Wi-Fi network again can be determined.

In one possible example, the method further includes the following. After responding to the pop-up request and popping up the authentication notification message, whether the authentication notification message is selected within a second time period is detected. On condition that the authentication notification message is not selected within the second time period, search for a third Wi-Fi network, where the third Wi-Fi network is a Wi-Fi network successfully accessed through the second Wi-Fi network interface previously. The third Wi-Fi network is accessed through the second Wi-Fi network interface.

Whether the authentication notification message is selected within the second time period can be detected. The second time period may be, for example, ten seconds or even longer, which is not limited herein. On condition that the authentication notification message is not selected by the user, if a network connection quality of the electronic device is required to be improved by means of secondary Wi-Fi currently, searching for the third Wi-Fi network is further performed. Moreover, in order to avoid popping up a new authentication notification message due to accessing a Wi-Fi network not yet successfully accessed through the second Wi-Fi network interface, the electronic device searches for the third Wi-Fi network successfully accessed through the second Wi-Fi network interface previously, so that the third Wi-Fi network can be accessed through the second Wi-Fi network interface directly, which allow the electronic device to use two Wi-Fi networks to surf the Internet at the same time.

As can be seen, in this example, if the authentication notification message popped up is not selected by the user within the second time period, searching for the third Wi-Fi network is further performed, where the third Wi-Fi network searched is a Wi-Fi network successfully accessed through the second Wi-Fi network interface previously, so that the third Wi-Fi network can be accessed directly, without a new authentication notification message appearing. As such, information interferences to the user caused by frequent pop-up of an authentication notification message can be avoided.

In one possible example, the method further includes the following. A quality score of the first Wi-Fi network is determined. Upon detecting that the quality score of the first Wi-Fi network is lower than a preset score, search for the second Wi-Fi network having a quality score higher than the preset score. A connection request is sent to the second Wi-Fi network. The pop-up request for the authentication notification message of the second Wi-Fi network is generated.

When a network quality of the first Wi-Fi network is poor, that is, when the quality score of the first Wi-Fi network is lower than the preset score, the electronic device enables a secondary Wi-Fi function and automatically searches for Wi-Fi networks in the current environment. The electronic device selects from the searched multiple Wi-Fi networks a Wi-Fi network having the best quality to send a connection request. Therefore, if the second Wi-Fi network having a quality score higher than the preset score is searched, a connection request is sent to the Wi-Fi network. Since authentication of the second Wi-Fi network has not been passed by the second Wi-Fi network interface, the pop-up request for the authentication notification message of the second Wi-Fi network is generated.

As can be seen, in this example, theoretically, the second Wi-Fi network should be a Wi-Fi network having the best network quality among the multiple Wi-Fi networks searched by the electronic device once the secondary Wi-Fi function is enabled. The second Wi-Fi network happens to be a Wi-Fi network of which authentication has not been passed by the secondary Wi-Fi of the electronic device, therefore, the pop-up request for the authentication notification message is generated, a Wi-Fi network having the best network quality in the current environment is selected as the second Wi-Fi network, and the connection request is sent to the second Wi-Fi network, which is beneficial to improving a network quality of the electronic device after successfully accessing the second Wi-Fi network through the second Wi-Fi network interface.

Consistent with the foregoing implementations described with reference to FIG. 2A, please refer to FIG. 3, FIG. 3 is a schematic flowchart illustrating a method for notification message control provided in implementations of the disclosure. The method is performed by an electronic device. The electronic device includes a first Wi-Fi network interface and a second Wi-Fi network interface. The electronic device accesses a first Wi-Fi network through the first Wi-Fi network interface. As illustrated in FIG. 3, the method for notification message control includes the following.

At S301, upon detecting a pop-up request for an authentication notification message of a second Wi-Fi network, the electronic device obtains a network identifier of the second Wi-Fi network, where the second Wi-Fi network is a Wi-Fi network that has not been successfully accessed through the second Wi-Fi network interface.

At S302, the electronic device detects, according to the network identifier, whether the second Wi-Fi network is contained in a historical connection record of requesting connection through the second Wi-Fi network interface, where the historical connection record is a network accessed by the electronic device in a previous network connection of a present network connection.

At S303, upon detecting that the second Wi-Fi network is contained in the historical connection record and a historical authentication notification message of the second Wi-Fi network is not selected, the electronic device determines that a response strategy for the pop-up request is to refuse to respond to the pop-up request for a first time period.

At S304, the electronic device responds to the pop-up request according to the response strategy.

As can be seen, in the implementations of the disclosure, the electronic device obtains the network identifier of the second Wi-Fi network upon detecting the pop-up request for the authentication notification message of the second Wi-Fi network, where the second Wi-Fi network is a Wi-Fi network that has not been successfully accessed through the second Wi-Fi network interface. The electronic device detects, according to the network identifier, whether the second Wi-Fi network is contained in the historical connection record of requesting connection through the second Wi-Fi network interface. The electronic device determines the response strategy for the pop-up request according to the historical connection record on condition that the second Wi-Fi network is contained in the historical connection record. The electronic device responds to the pop-up request according to the response strategy. Upon detecting the pop-up request for the authentication notification message of the second Wi-Fi network, instead of popping up the authentication notification message immediately, the electronic device obtains the network identifier of the second Wi-Fi network and determines, according to the network identifier, whether the second Wi-Fi network is contained in the historical connection record of requesting connection through the second Wi-Fi network interface, so that the response strategy for the pop-up request is determined according to the historical connection record of the second Wi-Fi network, to determine whether to pop up the authentication notification message this time, which can avoid interferences to a user caused by frequent pop-up of an authentication notification message.

In addition, on condition that an interval between the time of a present connection to the second Wi-Fi network through the second Wi-Fi network interface and the time of a previous connection to the second Wi-Fi network through the second Wi-Fi network interface is shorter than the first time period, if it is detected that the historical authentication notification message popped up in the previous requesting connection to the second Wi-Fi network is not selected by the user, it is determined that the user has no tendency to use the second Wi-Fi network this time. Therefore, the electronic device refuses to respond to the pop-up request and does not pop up the authentication notification message. In this situation, the electronic device can access another Wi-Fi network having a better network quality through the second Wi-Fi network interface, which can avoid information interferences to a user caused by frequent pop-up of an authentication notification message.

Consistent with the foregoing implementations described with reference to FIG. 2A and FIG. 3, please refer to FIG. 4, FIG. 4 is a schematic flowchart illustrating a method for notification message control provided in implementations of the disclosure. The method is performed by an electronic device. The electronic device includes a first Wi-Fi network interface and a second Wi-Fi network interface. The electronic device accesses a first Wi-Fi network through the first Wi-Fi network interface. As illustrated in FIG. 4, the method for notification message control includes the following.

At S401, upon detecting a pop-up request for an authentication notification message of a second Wi-Fi network, the electronic device obtains a network identifier of the second Wi-Fi network, where the second Wi-Fi network is a Wi-Fi network that has not been successfully accessed through the second Wi-Fi network interface.

At S402, the electronic device detects, according to the network identifier, whether the second Wi-Fi network is contained in a historical connection record of requesting connection through the second Wi-Fi network interface, where the historical connection record is a network accessed by the electronic device in a previous network connection of a present network connection.

At S403, upon detecting that the second Wi-Fi network is contained in the historical connection record and a historical authentication notification message of the second Wi-Fi network is not selected, the electronic device determines that a response strategy for the pop-up request is to respond to the pop-up request and pop up the authentication notification message after a first time period.

At S404, the electronic device responds to the pop-up request according to the response strategy.

As can be seen, in the implementations of the disclosure, the electronic device obtains the network identifier of the second Wi-Fi network upon detecting the pop-up request for the authentication notification message of the second Wi-Fi network, where the second Wi-Fi network is a Wi-Fi network that has not been successfully accessed through the second Wi-Fi network interface. The electronic device detects, according to the network identifier, whether the second Wi-Fi network is contained in the historical connection record of requesting connection through the second Wi-Fi network interface. The electronic device determines the response strategy for the pop-up request according to the historical connection record on condition that the second Wi-Fi network is contained in the historical connection record. The electronic device responds to the pop-up request according to the response strategy. Upon detecting the pop-up request for the authentication notification message of the second Wi-Fi network, instead of popping up the authentication notification message immediately, the electronic device obtains the network identifier of the second Wi-Fi network and determines, according to the network identifier, whether the second Wi-Fi network is contained in the historical connection record of requesting connection through the second Wi-Fi network interface, so that the response strategy for the pop-up request is determined according to the historical connection record of the second Wi-Fi network, to determine whether to pop up the authentication notification message this time, which can avoid interferences to a user caused by frequent pop-up of an authentication notification message.

In addition, although the historical authentication notification message of the second Wi-Fi network popped up previously is not selected by the user, if an interval between the time of a present requesting connection to the second Wi-Fi network and the time of the previous requesting connection to the second Wi-Fi network is longer than the first time period, the authentication notification message of the second Wi-Fi network is still popped up this time, so that the user can determine whether to access the second Wi-Fi network through the second Wi-Fi network interface, which can avoid frequent pop-up of an authentication notification message of a Wi-Fi network in a short time period.

Furthermore, the authentication notification message is used to prompt the user that the second Wi-Fi network can be accessed through the second Wi-Fi network interface currently. If the authentication notification message is selected by the user, an authentication interface of the second Wi-Fi network is further entered. If the authentication notification message is not selected by the user, a terminal records the time when the authentication notification message is popped up and information such as not being selected, so that in a next requesting connection to the second Wi-Fi network through the second Wi-Fi network interface, whether to pop up the authentication notification message of the second Wi-Fi network again can be determined.

Figure 5:
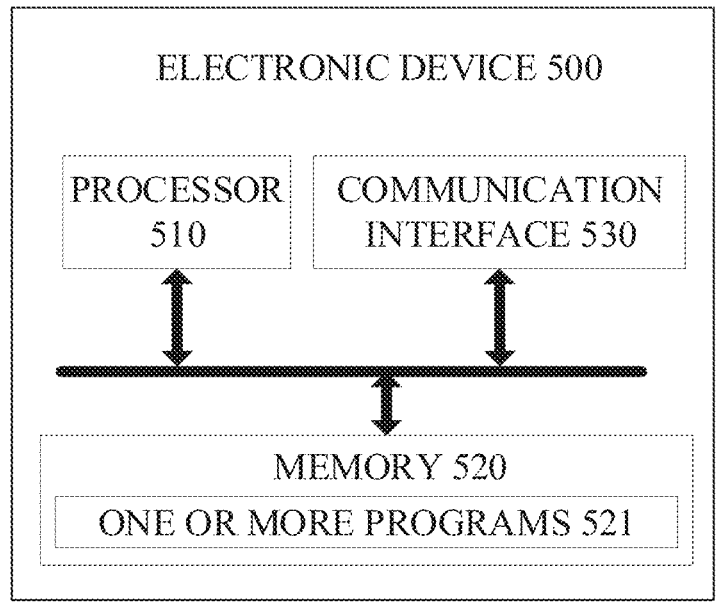
FIG. 5 is a schematic structural diagram illustrating an electronic device provided in implementations of the disclosure.

Consistent with the foregoing implementations described with reference to FIG. 2A, FIG. 3, and FIG. 4, please refer to FIG. 5, FIG. 5 is a schematic structural diagram illustrating an electronic device 500 provided in implementations of the disclosure. The electronic device 500 runs one or more application programs and operating systems. The electronic device 500 includes a first Wi-Fi network interface and a second Wi-Fi network interface. The electronic device 500 accesses a first Wi-Fi network through the first Wi-Fi network interface. As illustrated in FIG. 5, the electronic device 500 includes a processor 510, a memory 520, a communication interface 530, and one or more programs 521. The one or more programs 521 are stored in the memory 520 and configured to be executed by the processor 510. The one or more programs 521 include instructions which are operable to carry out the following actions. Upon detecting a pop-up request for an authentication notification message of a second Wi-Fi network, a network identifier of the second Wi-Fi network is obtained, where the second Wi-Fi network is a Wi-Fi network that has not been successfully accessed through the second Wi-Fi network interface. Whether the second Wi-Fi network is contained in a historical connection record of requesting connection through the second Wi-Fi network interface is detected according to the network identifier. A response strategy for the pop-up request is determined according to the historical connection record on condition that the second Wi-Fi network is contained in the historical connection record. Respond to the pop-up request according to the response strategy.

In one possible example, upon detecting a screen-on event for a touch screen, a target parameter value indicative of a network quality of the first Wi-Fi network is determined. Upon detecting that the target parameter value is greater than a first threshold, whether the first Wi-Fi network is in an active state is determined. On condition that the first Wi-Fi network is not in the active state, the second Wi-Fi network interface is deactivated, and network data is transmitted through the first Wi-Fi network.

As can be seen, in the implementations of the disclosure, the electronic device obtains the network identifier of the second Wi-Fi network upon detecting the pop-up request for the authentication notification message of the second Wi-Fi network, where the second Wi-Fi network is a Wi-Fi network that has not been successfully accessed through the second Wi-Fi network interface. The electronic device detects, according to the network identifier, whether the second Wi-Fi network is contained in the historical connection record of requesting connection through the second Wi-Fi network interface. The electronic device determines the response strategy for the pop-up request according to the historical connection record on condition that the second Wi-Fi network is contained in the historical connection record. The electronic device responds to the pop-up request according to the response strategy. Upon detecting the pop-up request for the authentication notification message of the second Wi-Fi network, instead of popping up the authentication notification message immediately, the electronic device obtains the network identifier of the second Wi-Fi network and determines, according to the network identifier, whether the second Wi-Fi network is contained in the historical connection record of requesting connection through the second Wi-Fi network interface, so that the response strategy for the pop-up request is determined according to the historical connection record of the second Wi-Fi network, to determine whether to pop up the authentication notification message this time, which can avoid interferences to a user caused by frequent pop-up of an authentication notification message.

In one possible example, the historical connection record is a network accessed by the electronic device in a previous network connection of a present network connection, and the historical connection record is that a quality score of a historical network speed of the second Wi-Fi network is lower than a preset score. The instructions of the programs operable to determine the response strategy for the pop-up request according to the historical connection record are specifically operable to carry out the following actions. Upon detecting that the quality score of the historical network speed of the second Wi-Fi network is lower than the preset score, determine that the response strategy for the pop-up request is to refuse to respond to the pop-up request for a first time period.

In one possible example, the historical connection record is a network accessed by the electronic device in a previous network connection of a present network connection, and the historical connection record is that a historical authentication notification message of the second Wi-Fi network is not selected. The instructions of the programs operable to determine the response strategy for the pop-up request according to the historical connection record are specifically operable to carry out the following actions. Upon detecting that the historical authentication notification message of the second Wi-Fi network is not selected, determine that the response strategy for the pop-up request is to refuse to respond to the pop-up request for a first time period.

In one possible example, the instructions of the programs are further operable to carry out the following actions. Upon detecting that the historical authentication notification message of the second Wi-Fi network is not selected, determine that the response strategy for the pop-up request is to respond to the pop-up request and pop up the authentication notification message after the first time period.

In one possible example, the instructions of the programs operable to respond to the pop-up request and pop up the authentication notification message are specifically operable to carry out the following actions. The authentication notification message is popped up and displayed on a present interface; or the authentication notification message is popped up and displayed on the present interface and then the authentication notification message is hidden in a message notification column.

In one possible example, the instructions of the programs are further operable to carry out the following actions. After responding to the pop-up request and popping up the authentication notification message, whether the authentication notification message is selected within a second time period is detected. On condition that the authentication notification message is selected within the second time period, jump to an authentication interface of the second Wi-Fi network. The authentication interface is used to prompt a user to enter authentication information for successfully accessing the second Wi-Fi network. The authentication information includes account information and password information.

In one possible example, the instructions of the programs are further operable to carry out the following actions. After responding to the pop-up request and popping up the authentication notification message, whether the authentication notification message is selected within a second time period is detected. On condition that the authentication notification message is not selected within the second time period, search for a third Wi-Fi network. The third Wi-Fi network is a Wi-Fi network successfully accessed through the Wi-Fi network interface previously. The third Wi-Fi network is accessed through the second Wi-Fi network interface.

In one possible example, the instructions of the programs are further operable to carry out the following actions. A quality score of the first Wi-Fi network is determined. Upon detecting that the quality score of the first Wi-Fi network is lower than a preset score, search for the second Wi-Fi network having a quality score higher than the preset score. A connection request is sent to the second Wi-Fi network. The pop-up request for the authentication notification message of the second Wi-Fi network is generated.

In one possible example, a quality score of the first Wi-Fi network is calculated according to a network quality parameter of the first Wi-Fi network, and the quality score of the second Wi-Fi network is calculated according to the network quality parameter of the second Wi-Fi network. The network quality parameter includes at least one of network signal strength, a network data transmission speed, network delay, or network throughput.

The foregoing technical solutions of the implementations of the disclosure are mainly described from the viewpoint of execution of the method. It can be understood that, in order to implement the above functions, the electronic device includes hardware structures and/or software modules corresponding to the respective functions. Those skilled in the art should readily recognize that, in combination with the exemplary units and scheme steps or operations described in the implementations disclosed herein, the disclosure can be implemented in hardware or a combination of hardware and computer software. Whether a function is implemented by way of hardware or computer software driving hardware depends on the particular application and design constraints of the technical solution. Those skilled in the art may use different methods to implement the described functions for each particular application, but such implementation should not be considered as beyond the scope of the disclosure.

According to the implementations of the disclosure, functional units may be divided for the electronic device in accordance with the foregoing method examples. For example, functional units may be divided according to corresponding functions, and two or more functions may be integrated into one processing unit. The above-mentioned integrated unit can be implemented in the form of hardware or software functional units. It should be noted that the division of units in the implementations of the disclosure is schematic and is merely a logical function division; there may be other division manners in actual implementation.

Figure 6:
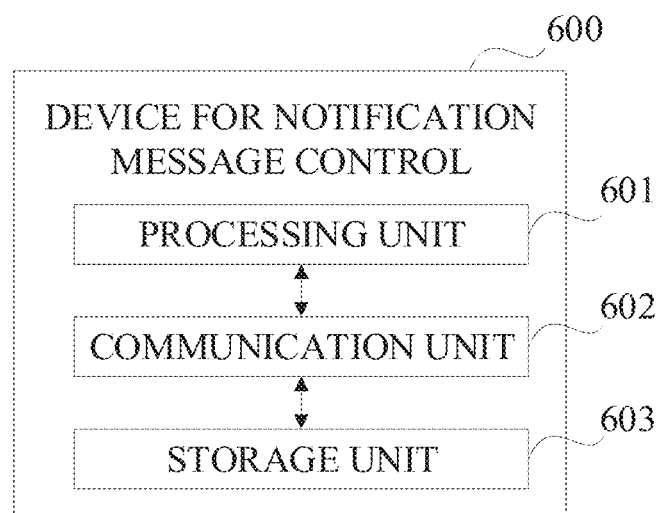
FIG. 6 is a block diagram illustrating functional units of a device for notification message control provided in implementations of the disclosure.

FIG. 6 is a block diagram illustrating functional units of a device 600 for notification message control provided in implementations of the disclosure. The device 600 for notification message control is applied to an electronic device. The device 600 for notification message control includes a processing unit 601 and a communication unit 602. The processing unit 601 is configured to obtain, with the communication unit 602, a network identifier of a second Wi-Fi network upon detecting a pop-up request for an authentication notification message of the second Wi-Fi network, where the second Wi-Fi network is a Wi-Fi network that has not been successfully accessed through the second Wi-Fi network interface. The processing unit 601 is configured to detect, according to the network identifier, whether the second Wi-Fi network is contained in a historical connection record of requesting connection through the second Wi-Fi network interface. The processing unit 601 is configured to determine a response strategy for the pop-up request according to the historical connection record on condition that the second Wi-Fi network is contained in the historical connection record. The processing unit 601 is configured to respond to the pop-up request according to the response strategy.

As can be seen, in the implementations of the disclosure, the electronic device obtains the network identifier of the second Wi-Fi network upon detecting the pop-up request for the authentication notification message of the second Wi-Fi network, where the second Wi-Fi network is a Wi-Fi network that has not been successfully accessed through the second Wi-Fi network interface. The electronic device detects, according to the network identifier, whether the second Wi-Fi network is contained in the historical connection record of requesting connection through the second Wi-Fi network interface. The electronic device determines the response strategy for the pop-up request according to the historical connection record on condition that the second Wi-Fi network is contained in the historical connection record. The electronic device responds to the pop-up request according to the response strategy. Upon detecting the pop-up request for the authentication notification message of the second Wi-Fi network, instead of popping up the authentication notification message immediately, the electronic device obtains the network identifier of the second Wi-Fi network and determines, according to the network identifier, whether the second Wi-Fi network is contained in the historical connection record of requesting connection through the second Wi-Fi network interface, so that the response strategy for the pop-up request is determined according to the historical connection record of the second Wi-Fi network, to determine whether to pop up the authentication notification message this time, which can avoid interferences to a user caused by frequent pop-up of an authentication notification message.

In one possible example, the historical connection record is a network accessed by the electronic device in a previous network connection of a present network connection, and the historical connection record is that a quality score of a historical network speed of the second Wi-Fi network is lower than a preset score. The processing unit 601 configured to determine the response strategy for the pop-up request according to the historical connection record is configured to: determine that the response strategy for the pop-up request is to refuse to respond to the pop-up request for a first time period, upon detecting that the quality score of the historical network speed of the second Wi-Fi network is lower than the preset score.

In one possible example, the historical connection record is a network accessed by the electronic device in a previous network connection of a present network connection, and the historical connection record is that a historical authentication notification message of the second Wi-Fi network is not selected. The processing unit 601 configured to determine the response strategy for the pop-up request according to the historical connection record is configured to: determine that the response strategy for the pop-up request is to refuse to respond to the pop-up request for a first time period, upon detecting that the historical authentication notification message of the second Wi-Fi network is not selected.

In one possible example, the processing unit 601 is further configured to determine that the response strategy for the pop-up request is to respond to the pop-up request and pop up the authentication notification message after the first time period, upon detecting that the historical authentication notification message of the second Wi-Fi network is not selected.

In one possible example, the processing unit 601 configured to respond to the pop-up request and pop up the authentication notification message is configured to: pop up and display the authentication notification message on a present interface, or pop up and display the authentication notification message on the present interface and then hide the authentication notification message in a message notification column.

In one possible example, the processing unit 601 is further configured to: detect whether the authentication notification message is selected within a second time period after responding to the pop-up request and popping up the authentication notification message; and jump to an authentication interface of the second Wi-Fi network on condition that the authentication notification message is selected within the second time period, where the authentication interface is used to prompt a user to enter authentication information for successfully accessing the second Wi-Fi network, and the authentication information includes account information and password information.

In one possible example, the processing unit 601 is further configured to: detect whether the authentication notification message is selected within a second time period after responding to the pop-up request and popping up the authentication notification message; search for a third Wi-Fi network on condition that the authentication notification message is not selected within the second time period, where the third Wi-Fi network is a Wi-Fi network successfully accessed through the second Wi-Fi network interface previously; and access the third Wi-Fi network through the second Wi-Fi network interface.

In one possible example, the processing unit 601 is further configured to: determine a quality score of the first Wi-Fi network; search for the second Wi-Fi network having a quality score higher than a preset score upon detecting that the quality score of the first Wi-Fi network is lower than the preset score; and send a connection request to the second Wi-Fi network, and generate the pop-up request for the authentication notification message of the second Wi-Fi network.

In one possible example, a quality score of the first Wi-Fi network is calculated according to a network quality parameter of the first Wi-Fi network, and the quality score of the second Wi-Fi network is calculated according to the network quality parameter of the second Wi-Fi network. The network quality parameter includes at least one of network signal strength, a network data transmission speed, network delay, or network throughput.

The electronic device may further include a storage unit 603. The processing unit 601 and the communication unit 602 may be a controller or a processor. The storage unit 603 may be a memory.

According to implementations of the disclosure, a non-transitory computer-readable storage medium is further provided. The non-transitory computer-readable storage medium stores computer programs for electronic data interchange. The computer programs cause a computer to execute all or part of the operations of the method described in the foregoing method implementations. The computer may include an electronic device.

According to implementations of the disclosure, a computer program product is further provided. The computer program product includes a non-transitory computer-readable storage medium configured to store computer programs. The computer programs are operable with a computer to execute all or part of the operations of the method described in the foregoing method implementations. The computer program product may be a software installation package, and the computer may include an electronic device.

It is to be noted that, for the sake of simplicity, the foregoing method implementations are described as a series of action combinations, however, it will be appreciated by those skilled in the art that the disclosure is not limited by the sequence of actions described. That is because that, according to the disclosure, certain steps or operations may be performed in other order or simultaneously. Besides, it will be appreciated by those skilled in the art that the implementations described in the specification are exemplary implementations and the actions and modules involved are not necessarily essential to the disclosure.

In the foregoing implementations, the description of each implementation has its own emphasis. For the parts not described in detail in one implementation, reference may be made to related descriptions in other implementations.

In the implementations of the disclosure, it should be understood that, the device/apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or assemblies may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the disclosure may be integrated into one control unit, or each unit may be physically present, or two or more units may be integrated into one unit. The above-mentioned integrated unit can be implemented in the form of hardware or a software program module.

The integrated unit may be stored in a computer-readable memory when it is implemented in the form of a software program module and is sold or used as a separate product. Based on such understanding, the technical solutions of the disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to execute all or part of the operations of the method described in the various implementations of the disclosure. The memory includes various medium capable of storing program codes, such as a universal serial bus (USB), a read-only memory (ROM), a RAM, a removable hard disk, disk, compact disc (CD), or the like.

It will be understood by those of ordinary skill in the art that all or part of the operations of the method of the implementations described above may be accomplished by means of a program to instruct associated hardware, the program may be stored in a computer-readable memory, which may include a flash memory, a ROM, a RAM, disk or CD, and so on.

What is claimed is:

1. A method for notification message control, performed by an electronic device, the electronic device comprising a first wireless fidelity (Wi-Fi) network interface and a second Wi-Fi network interface and the electronic device accessing a first Wi-Fi network through the first Wi-Fi network interface, the method comprising:
   obtaining a network identifier of a second Wi-Fi network upon detecting a pop-up request for an authentication notification message of the second Wi-Fi network, the second Wi-Fi network being a Wi-Fi network that has not been successfully accessed through the second Wi-Fi network interface;
   determining a response strategy for the pop-up request according to a historical connection record of requesting connection through the second Wi-Fi network interface, upon detecting that the second Wi-Fi network is contained in the historical connection record according to the network identifier; and
   responding to the pop-up request according to the response strategy;
   wherein the historical connection record contains a network accessed by the electronic device in a previous network connection of a present network connection, and determining the response strategy for the pop-up request according to the historical connection record comprises:
      determining that the response strategy for the pop-up request is to refuse to respond to the pop-up request for a first time period, upon detecting that a quality score of a historical network speed of the second Wi-Fi network is lower than a preset score, wherein the historical connection record records that the quality score of the historical network speed of the second Wi-Fi network is lower than the preset score; or
      determining that the response strategy for the pop-up request is to refuse to respond to the pop-up request for a first time period, upon detecting that a historical authentication notification message of the second Wi-Fi network is not selected by a user, wherein the historical connection record records that the historical authentication notification message of the second Wi-Fi network is not selected by the user.

2. The method of claim 1, further comprising:
   determining that the response strategy for the pop-up request is to respond to the pop-up request and pop up the authentication notification message after the first time period, upon detecting that the historical authentication notification message of the second Wi-Fi network is not selected by the user.

3. The method of claim 2, wherein responding to the pop-up request and popping up the authentication notification message comprise:
   popping up and displaying the authentication notification message on a present interface, or popping up and displaying the authentication notification message on the present interface and then hiding the authentication notification message in a message notification column.

4. The method of claim 2, further comprising:
   after responding to the pop-up request and popping up the authentication notification message,
      detecting that the authentication notification message is selected by the user within a second time period; and
      jumping to an authentication interface of the second Wi-Fi network, wherein the authentication interface is used to prompt the user to enter authentication information of successfully accessing the second Wi-Fi network, and the authentication information comprises account information and password information.

5. The method of claim 2, further comprising:
   after responding to the pop-up request and popping up the authentication notification message,
      detecting that the authentication notification message is not selected by the user within a second time period; and
      accessing a third Wi-Fi network through the second Wi-Fi network interface, wherein the third Wi-Fi network is a Wi-Fi network successfully accessed through the second Wi-Fi network interface previously.

6. The method of claim 1, further comprising:
   determining a quality score of the first Wi-Fi network;
   searching for the second Wi-Fi network having a quality score higher than a preset score upon detecting that the quality score of the first Wi-Fi network is lower than the preset score; and
   sending a connection request to the second Wi-Fi network, and generating the pop-up request for the authentication notification message of the second Wi-Fi network.

7. The method of claim 1, wherein a quality score of the first Wi-Fi network is generated according to a network quality parameter of the first Wi-Fi network, and the quality score of the second Wi-Fi network is generated according to the network quality parameter of the second Wi-Fi network, wherein the network quality parameter comprises at least one of network signal strength, a network data transmission speed, network delay, or network throughput.

8. An electronic device, comprising:
   a first wireless fidelity (Wi-Fi) network interface;
   a second Wi-Fi network interface;
   a processor; and
   a memory, coupled to the processor and storing one or more programs;
   wherein the programs comprise instructions which are operable with the processor to:

obtain a network identifier of a second Wi-Fi network upon detecting a pop-up request for an authentication notification message of the second Wi-Fi network, the second Wi-Fi network being a Wi-Fi network that has not been successfully accessed through the second Wi-Fi network interface, the electronic device accessing a first Wi-Fi network through the first Wi-Fi network interface;

detect that the second Wi-Fi network is contained in a historical connection record of requesting connection through the second Wi-Fi network interface according to the network identifier;

determine a response strategy for the pop-up request according to the historical connection record; and respond to the pop-up request according to the response strategy;

wherein the historical connection record contains a network accessed by the electronic device in a previous network connection of a present network connection, and the processor configured to determine the response strategy for the pop-up request according to the historical connection record is configured to:

determine that the response strategy for the pop-up request is to refuse to respond to the pop-up request for a first time period, upon detecting that a quality score of a historical network speed of the second Wi-Fi network is lower than a preset score, wherein the historical connection record records that the quality score of the historical network speed of the second Wi-Fi network is lower than the preset score; or determine that the response strategy for the pop-up request is to refuse to respond to the pop-up request for a first time period, upon detecting that a historical authentication notification message of the second Wi-Fi network is not selected by a user, wherein the historical connection record records that the historical authentication notification message of the second Wi-Fi network is not selected by the user.

9. The electronic device of claim 8, wherein is further configured to:

determine that the response strategy for the pop-up request is to respond to the pop-up request and pop up the authentication notification message after the first time period, upon detecting that the historical authentication notification message of the second Wi-Fi network is not selected by the user.

10. The electronic device of claim 9, wherein the processor configured to respond to the pop-up request and pop up the authentication notification message is configured to:

pop up and display the authentication notification message on a present interface, or pop up and display the authentication notification message on the present interface and then hide the authentication notification message in a message notification column.

11. The electronic device of claim 9, wherein the processor is further configured to:

after responding to the pop-up request and popping up the authentication notification message, detect that the authentication notification message is selected by the user within a second time period; and jump to an authentication interface of the second Wi-Fi network, wherein the authentication interface is used to prompt the user to enter authentication information of successfully accessing the second Wi-Fi network, and the authentication information comprises account information and password information.

12. The electronic device of claim 9, wherein the processor is further configured to:

after responding to the pop-up request and popping up the authentication notification message, detect that the authentication notification message is not selected by the user within a second time period; and access a third Wi-Fi network through the second Wi-Fi network interface, wherein the third Wi-Fi network is a Wi-Fi network successfully accessed through the second Wi-Fi network interface previously.

13. The electronic device of claim 8, wherein the processor is further configured to:

determine a quality score of the first Wi-Fi network;

search for the second Wi-Fi network having a quality score higher than a preset score upon detecting that the quality score of the first Wi-Fi network is lower than the preset score; and send a connection request to the second Wi-Fi network, and generate the pop-up request for the authentication notification message of the second Wi-Fi network.

14. The electronic device of claim 8, wherein a quality score of the first Wi-Fi network is generated according to a network quality parameter of the first Wi-Fi network, and the quality score of the second Wi-Fi network is generated according to the network quality parameter of the second Wi-Fi network, wherein the network quality parameter comprises at least one of network signal strength, a network data transmission speed, network delay, or network throughput.

15. A non-transitory computer-readable storage medium storing computer programs which, when executed by a processor of an electronic device, cause the processor to carry out actions, comprising:

obtaining a network identifier of a second wireless fidelity (Wi-Fi) network upon detecting a pop-up request for an authentication notification message of the second Wi-Fi network, the second Wi-Fi network being a Wi-Fi network that has not been successfully accessed through a second Wi-Fi network interface of the electronic device, the electronic device accessing a first Wi-Fi network through a first Wi-Fi network interface of the electronic device;

determining a response strategy for the pop-up request according to a historical connection record of requesting connection through the second Wi-Fi network interface, upon detecting that the second Wi-Fi network is contained in the historical connection record according to the network identifier; and responding to the pop-up request according to the response strategy;

wherein the historical connection record contains a network accessed by the electronic device in a previous network connection of a present network connection, and the computer programs executed by the processor to carry out actions of determining the response strategy for the pop-up request according to the historical connection record are executed by the processor to carry out actions, comprising:

determining that the response strategy for the pop-up request is to refuse to respond to the pop-up request for a first time period, upon detecting that a quality score of a historical network speed of the second Wi-Fi network is lower than a preset score, wherein the historical connection record records that the quality score of the historical network speed of the second Wi-Fi network is lower than the preset score; or determining that the response strategy for the pop-up request is to refuse to respond to the pop-up request for a first time period, upon detecting that a historical authentication notification message of the second Wi-Fi network is not selected by a user, wherein the historical connection record records that the historical authentication notification message of the second Wi-Fi network is not selected by the user.

16. The non-transitory computer-readable storage medium of claim 15, wherein the computer programs are further executed by the processor to carry out actions, comprising:

determining that the response strategy for the pop-up request is to respond to the pop-up request and pop up the authentication notification message after the first time period, upon detecting that the historical authentication notification message of the second Wi-Fi network is not selected by the user.

17. The non-transitory computer-readable storage medium of claim 16, wherein the computer programs executed by the processor to carry out actions of responding to the pop-up request and popping up the authentication notification message are executed by the processor to carry out actions, comprising:

popping up and displaying the authentication notification message on a present interface, or popping up and displaying the authentication notification message on the present interface and then hiding the authentication notification message in a message notification column.

18. The non-transitory computer-readable storage medium of claim 16, wherein the computer programs are further executed by the processor to carry out actions, comprising:

after responding to the pop-up request and popping up the authentication notification message, detecting that the authentication notification message is selected by the user within a second time period; and jumping to an authentication interface of the second Wi-Fi network, wherein the authentication interface is used to prompt the user to enter authentication information of successfully accessing the second Wi-Fi network, and the authentication information comprises account information and password information.

19. The non-transitory computer-readable storage medium of claim 16, wherein the computer programs are further executed by the processor to carry out actions, comprising:

after responding to the pop-up request and popping up the authentication notification message, detecting that the authentication notification message is not selected by the user within a second time period; and accessing a third Wi-Fi network through the second Wi-Fi network interface, wherein the third Wi-Fi network is a Wi-Fi network successfully accessed through the second Wi-Fi network interface previously.

20. The non-transitory computer-readable storage medium of claim 15, wherein the computer programs are further executed by the processor to carry out actions, comprising:

determining a quality score of the first Wi-Fi network;

searching for the second Wi-Fi network having a quality score higher than a preset score upon detecting that the quality score of the first Wi-Fi network is lower than the preset score; and sending a connection request to the second Wi-Fi network, and generating the pop-up request for the authentication notification message of the second Wi-Fi network.

* * * * *